Dec. 13, 1960   P. AMIARD   2,963,867
HYDRAULIC TORQUE CONVERTERS
Filed Jan. 22, 1957   7 Sheets-Sheet 1

Dec. 13, 1960  P. AMIARD  2,963,867
HYDRAULIC TORQUE CONVERTERS
Filed Jan. 22, 1957  7 Sheets-Sheet 5

Dec. 13, 1960   P. AMIARD   2,963,867
HYDRAULIC TORQUE CONVERTERS
Filed Jan. 22, 1957

United States Patent Office 2,963,867
Patented Dec. 13, 1960

2,963,867

HYDRAULIC TORQUE CONVERTERS

Paul Amiard, Paris, France, assignor to Societe Anonyme Francaise du Ferodo, Paris, France, a corporation of France Filed Jan. 22, 1957, Ser. No. 635,254

Claims priority, application France Jan. 23, 1956

7 Claims. (Cl. 60—54)

The present invention relates to hydraulic two-phase torque converters with one torque conversion phase and one coupling phase, particularly for automobile vehicles, of the kind comprising a pump, a turbine and a stator or reaction member, the passage between the pump and the turbine being located in the region of the toroidal fluid circuit which is farthest away from the axis, the reaction member extending into the region of the said circuit which is closest to the said axis, while the design radii at the entrance and at the exit of the said reaction member are substantially equal.

In the present description, the conventions adopted for the definition of the blade angles are those given in System A of the 1952 Handbook of the Society of Automotive Engineers, pages 792–794, and the conventions adopted for the definition of the bias angles and the scroll angles are also those given in the said 1952 Handbook, but completed by a sign convention in order to define the orientation.

In the present description, the blade angle at a given point on the mean camber surface of a blade, is the term given to the angle comprised between on the one hand a plane starting from the axis and passing through the said point, and on the other hand a tangent to the path over the mean camber surface of the toroidal flow surface relative to the said point, the said blade angle being considered as positive or negative, depending on whether the blade tends to direct the flow in the driving direction or in the reverse direction.

In particular, the entrance angle (or exit angle) of the blades of each member following the design path surface is measured from a plane containing the axis of the apparatus and passing through the intersection of the inlet edge (or the outlet edge) of a blade and of the said surface on the mean camber surface of the blade, and is taken as positive when the blade tends to direct the flow in the direction of rotation of the pump, and as negative in the opposite direction.

In the present description, taking as the positive direction the direction of rotation of the pump, the term bias angle of the entrance (or of the exit) of a blade is given to the algebraic angle through which it is necessary to turn the radius starting from the axis and passing through the point of the inlet edge (or outlet edge) of the blade located on the design path surface, in order to apply this radius over the projection on a plane perpendicular to the axis of the inlet edge (or outlet edge) of the blade, in the direction from its extremity on the internal shell towards that on the outer shell (see SAE Handbook 1952, page 793).

In the present description, taking as the positive direction the direction of rotation of the pump, the scroll angle of a blade is the algebraic dihedral angle through which it is necessary to rotate about the axis a plane which starts from the said axis in order to bring this plane from a position in which it meets the intersection of the design path surface with the inlet edge of the mean camberline of the blade, to a position in which it meets the intersection of the said surface with the outlet edge of the mean camberline of the same blade (see SAE Handbook 1952, page 793).

An essential object of the invention is a hydraulic torque converter which gives irreproachable service in a certain number of applications, and more especially in automobile vehicles in which the ratio of power to weight is low, that is to say automobile vehicles of the type generally constructed in Europe, for example, as a simple indication and without any implied limitation, of 50 to 70 H.P. for a weight of 1,000 to 1500 kgs.

In order to achieve this precise object, the applicant has sought to obtain a stall torque ratio comprised between 2.2 and 2.8 while at the same time retaining the following features: adequate torque ratio, both at the moment of starting-up the turbine and at turbine speeds equal to or greater than one half that obtained at the coupling point, that is to say of transition between the two phases, for the same input torque; adequate efficiency at the various speed ratios in the torque conversion range and adequate maximum value of this efficiency during this range; range of conversion extending up to turbine speeds sufficiently high to obtain the desired flexibility in driving; adequate speed ratio at the coupling point; efficiency increasing rapidly with the speed of the turbine in the coupling range; input speed during acceleration of the turbine neither too high to avoid noise and to prevent wear of the engine, nor too low in order to avoid weakening of the input torque due to the characteristics of engines with carburation and to avoid reduction of the torque ratios for given output speeds; engine speed neither too rapidly increasing nor too little variable with the output speed during the torque conversion range; and with all these advantages, an apparatus having sufficiently small overall dimensions.

After researches and tests, the applicant has solved the problem which was thus presented, and has invented a hydraulic torque converter which complies with the requirements of this problem, and a prototype of which has effectively been constructed and tested with success on an automobile vehicle.

A hydraulic torque converter in accordance with the invention has the outstanding particular feature that the blade exit angle of the pump along the design path surface is comprised between —30° and —20°, while the entrance angle of the blades of the pump along the said surface can preferably have a value comprised between —40° and —10°.

The applicant has thus created a new series of converters which are distinguished from other series proposed up to the present time, both by the structure of the apparatus and by the object in view.

Forms of embodiment of the invention will now be described below by way of example, reference being made to the accompanying drawings, in which.

Figure 1:
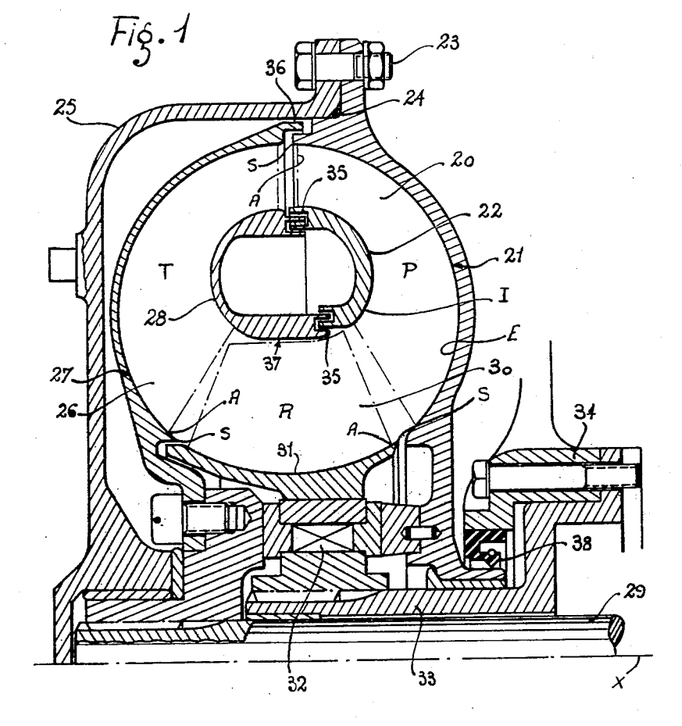
Fig. 1 is a half-view in longitudinal cross-section of a hydraulic torque converter in accordance with the invention.
Figure 2:
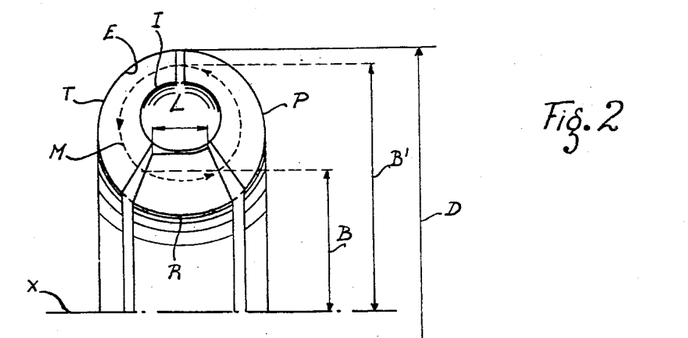
Fig. 2 is a half-view similar to that of Fig. 1, but given in diagrammatic form for the sake of clearness and on a smaller scale.

In the form of embodiment shown in Figs. 1 to 12, a hydraulic torque converter in accordance with the invention is composed of a pump P, a turbine T, and a reaction member R (see Figs. 1 and 2).

The pump member P comprises a circular row of blades 20 which extends between an outer shell 21 and an inner shell 22. The blades 20 and the shells 21 and 22 form a monobloc unit produced in any suitable manner (clamping, welding, brazing, casting, etc.). The pump P is fixed at 23 with a fluid-tight joint 24 to a fly-wheel 25. This fly-wheel, which is bell-shaped, surrounds the turbine T and is driven by the driving shaft (not shown) of the converter.

The turbine member T carries a circular row of blades 26 which extends between an outer shell 27 and an inner shell 28. The blades 26 and the shells 27 and 28 form a monobloc assembly which is produced in any suitable manner. The turbine T is mounted fast for rotation with the driven shaft shown at 29, of the converter.

The reaction member R comprises a circular row of blades 30 which extend around a toric shell 31. The blades 30 and the wall 31 form a monobloc assembly produced by any suitable means. The reaction member R is mounted through the intermediary of a free-wheel 32, on a member 33 which is locked for rotation on a fixed casing 34. The free-wheel 32 is directed in such manner that the reactor R can rotate in the direction of rotation F (see Fig. 4) of the engine and of the pump P, but is prevented by fixing from turning in the reverse direction.

The walls 21, 27 and 31 define the complete outer shell E of the converter, while the walls 22 and 28 define the complete inner shell I. The oil or other suitable fluid with which the converter is filled and which is retained, especially by a rotary joint 38, ensures, by its action in the space comprised between the shells E and I, the transmission between the pump P and the driven shaft 29.

The area of the rectangular cross-section in each channel of the pump P formed between the walls 21 and 22 and two successive blades 20 is made substantially constant from the entrance to the exit. In the turbine T and in the reactor R, a similar area is made substantially constant from the entrance up to a point located half-way between the entrance and the exit, but decreases from this point onwards to the exit. The cross-section of the channels of the various members are preferably in the form substantially of a parallelogram.

The extremities A of the blades of each member P, T or R, are inset with respect to the extremities S of the corresponding walls 21 and 22, 27 and 28, or 31, which makes uniform the stream of liquid at the entrance and at the exit of the blades. The extremities S are rounded for the entrance of the members and are sharp-edged for the exit. Labyrinth joints 35 are provided in addition between the walls 22 and 28, while a labyrinth joint 36 is formed between the walls 21 and 27 and the flywheel 25. The clearance 37 provided between the blades 30 and the wall 28 is small so as not to exceed, except at the entrance of the reactor, 0.4% of the maximum diameter D of the converter (see Fig. 2).

As can also be seen from Fig. 2, the exit of the blades of the pump P and the entrance of the blades of the turbine T are located in the zone of the toroidal fluid circuit which is farthest away from the axis X of the apparatus, while the blades of the reactor are in the zone which is nearest to that axis X.

The distance B from the axis X to the design path surface M of flow of fluid is substantially the same at the entrance and at the exit of the reactor. This distance B is comprised from 56% and 59% of the distance B' between the axis to the surface M at the exit of the pump P or the entrance of the turbine T.

The section of passage which is available to the fluid for passing from the pump to the turbine is essentially equal to that available for passage from the turbine to the reactor, and also to that for passing from the reactor to the pump. The section available for the passage of the fluid from the pump to the turbine is preferably chosen to be 5 to 6% less than each of the two others, especially when at the exit of the pump and/or at the entrance of the turbine, the blades are less inclined than at the other passages, in order to compensate substantially for the more or less considerable effect of obstruction to the flow due at that point to the blades.

The area of each of the surfaces of revolution forming cross-sections of passage of the fluid from the pump to the turbine, turbine to reactor and reactor to pump, is chosen to be between 23% and 28% of the area of a circle of diameter D (see Fig. 2).

The radius of curvature at various points of the shell I is moreover such that it remains greater than 40% of the radius of curvature of the shell E. The radius of curvature of the shell I can vary considerably from one point to another, while that of the shell E varies little, but it is greater in the zone of the reactor than in that of the pump or the turbine. The curve of the blades is generally small in spite of the large amounts of bias obtained, even on the side of the shell I where this bias is greatest, which ensures an excellent efficiency.

In the vicinity of the shell I, the reactor blades have an axial dimension L which is comprised between 10% and 13% of the diameter D (see Fig. 2).

Figures 3, 4, 5:
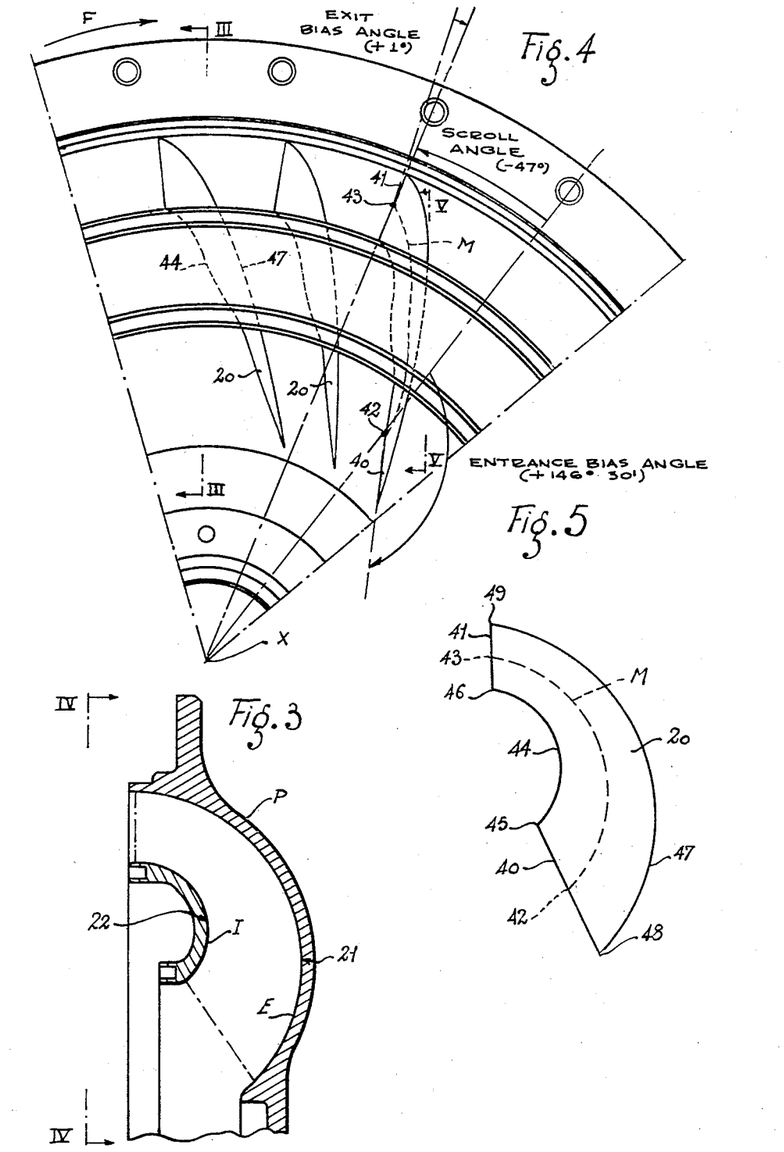
Fig. 3 is a half view of the pump of the converter in longitudinal cross-section taken along the line III—III of Fig. 4.
Fig. 4 is a partial view of this pump following the arrows IV—IV of Fig. 3.
Fig. 5 is a view of a pump blade in the direction of the arrows V—V of Fig. 4.

Reference will now be made more especially to Figs. 3 to 5 which relate to a pump P constructed of steel sheet parts for example. The pump P comprises 26 blades 20 regularly and uniformly distributed around the axis X and all precisely identical. Each blade 20 is curved back towards the rear, that is to say in the direction opposite to the driving direction F.

The entrance edges 40 and entrance edges 41 of each blade 20 are rectilinear in both cases. The entrance edge 40 makes an angle with a plane which passes through the axis X and which would pass through its point 42 located on the surface M. The edge 40 is so situated that with this plane, the projection of the said edge 40 on a plane perpendicular to the axis X makes an entrance bias angle of +146°30'. The outer extremity of the straight exit edge 41 is slightly in front of the inner extremity of this edge 41 in the direction F, so that the edge 41 and the plane containing the axis X and passing through the point 43 of the edge located on the surface M, make an exit bias angle of +1°. The scroll angle, that is to say the dihedral formed by the planes proceeding from the axis X and passing respectively through the points 42 and 43, is about −17°.

The blade angle at a given point on the mean camber surface of each blade is, as has already been stated, that comprised on the one hand between a plane starting from the axis X and passing through the said point, and on the other hand a tangent to the line left on the said mean camber surface by the toric flow surface relative to the said point. This angle is given a positive or negative sign, depending on whether the blade tends to direct the flow in the direction F or in the opposite direction.

Along the design path surface M, the blade angle of each blade 20 becomes smaller in absolute value and increases in algebraic value between the point 42 and the point 43. This angle has a value of —31° at the point 42 and a value of —22° at the point 43.

Along the line 44 of each blade 20 in contact with the shell I, the blade angle becomes smaller in absolute value and increases in algebraic value between the entrance point 45 and the exit point 46. This angle has a value of —35° at the point 45 and of —23° at the point 46.

Along the line 47 of each blade 20 at the contact of the shell E, the blade angle becomes smaller in absolute value and increases in algebraic value between the entrance point 48 and the exit point 49. This angle has a value of —26°30′ at the point 48 and of —21° at the point 49.

The pressure face of each blade 20 (which is visible in Fig. 5) makes a slightly obtuse angle with the wall 21 along the whole length of the line 47.

With the form of pump which has just been described above, the speeds of flow are made uniform along the shells E and I.

Figures 6, 7, 8:
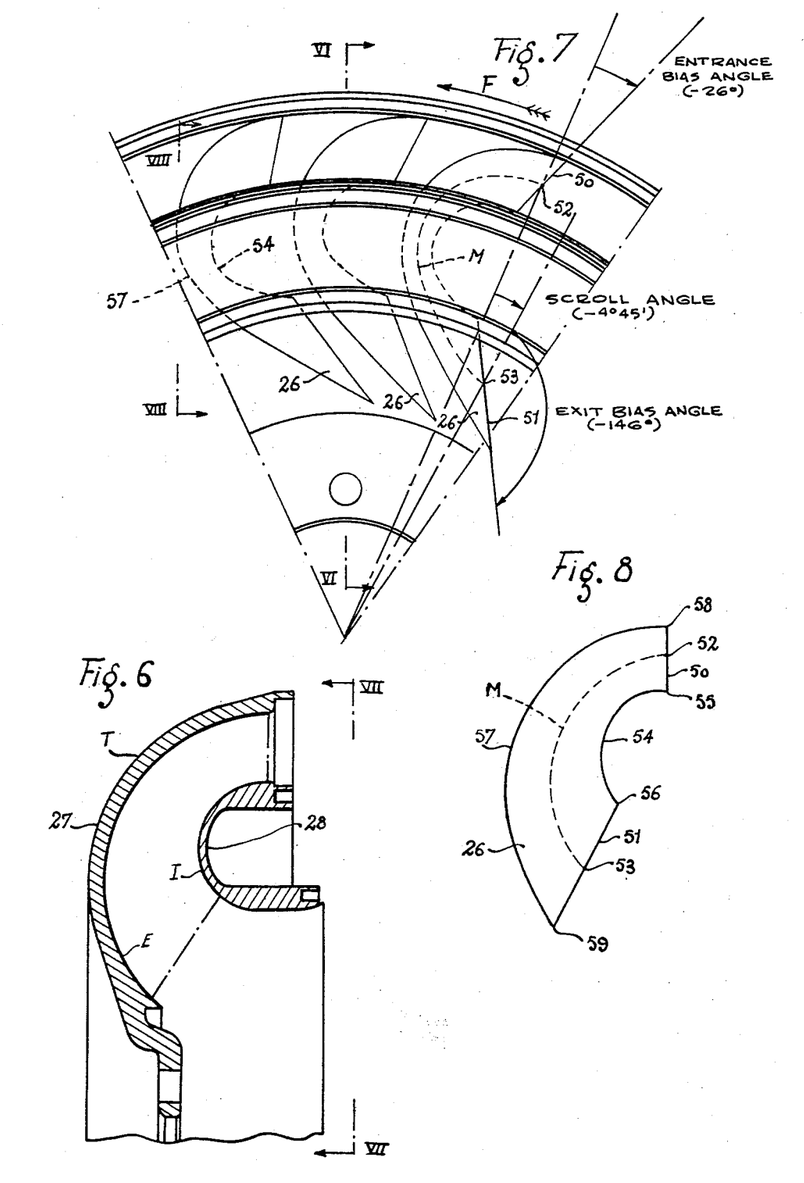
Fig. 6 is a half-view of the turbine of the converter in longitudinal cross-section taken along the line VI—VI of Fig. 7.
Fig. 7 is a partial view of this turbine in the direction of the arrows VII—VII of Fig. 6.
Fig. 8 is a view of a turbine blade in the direction of the arrows VIII—VIII of Fig. 7.

More particular reference will now be made to Figs. 6 to 8, which relate to a turbine T made of sheet steel parts for example. The turbine T comprises 23 blades 26 uniformly distributed around the axis, and all identical. Each blade 26 is first curved back towards the front, that is to say in the direction F, and then curved back towards the rear, in the direction opposite to F.

The entrance edges 50 and exit edges 51 of each blade 20 are all straight and make angles with planes which are starting from the axis X and which would respectively pass through their points 52 and 53, situated on the surface M. The edge 50 is made such that with the plane which corresponds to it, its projection on a plane perpendicular to the axis X forms an entrance bias angle of —26°. The edge 51 makes an exit bias angle of —146°. The scroll angle, that is to say the dihedral formed by the planes starting from the axis X and passing respectively through the points 52 and 53 is —4°45′.

Figure 2A:
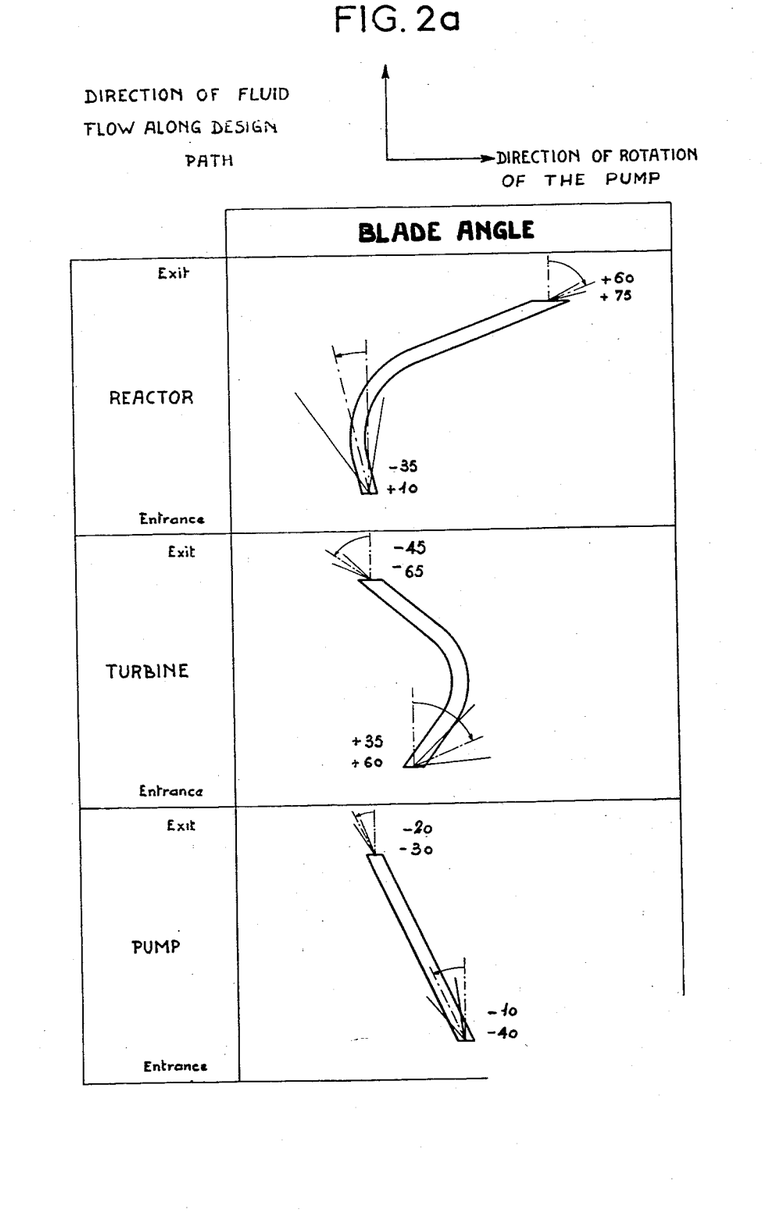
Fig. 2a illustrates the blade angles and configuration in accordance with the invention.

Along the design path surface M, the blade angle of each blade 26 (see Fig. 2a) becomes smaller in algebraic value between the point 52 and the point 53. This angle has a value of +52°30′ at the point 52 and a value of —56°15′ at the point 53.

Along the line 54 of each blade 26 at the contact of the shell I, the blade angle becomes less in algebraic value between the entrance point 55 and the exit point 56. This angle has a value of +54°30′ at the point 55 and of 58° at the point 56.

Along the line 57 of each blade at the contact of the shell E, the blade angle becomes less in algebraic value between the entrance point 58 and the exit point 59. This angle has a value of +50°15′ at the point 58 and —54°30′ at the point 59.

The pressure face of each blade 26 (which is located below, and therefore not visible on Fig. 8) makes an angle with the wall 27 which decreases and again increases between the points 58 and 59. This angle is 103°, that is to say slightly obtuse at the point 58, and 73°, or in other words acute at the half distance between the points 58 and 59, and is 107°, namely once more obtuse, at the point 59.

The reactor R (see more especially Figs. 9 to 11) has blades 30 made of sheet steel, for example. These blades are fifteen in number and are uniformly spaced apart around the axis X and are all identical. Each blade 30 is curved back towards the front so as to impart to the fluid passing out of the turbine T a high component in the direction F and to ensure a high reaction torque during starting.

Figure 9:
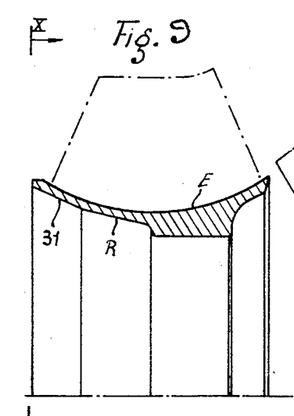
Fig. 9 is a half-view of the reaction member of the converter in longitudinal cross-section, taken along the line IX—IX of Fig. 10.
Figure 10:
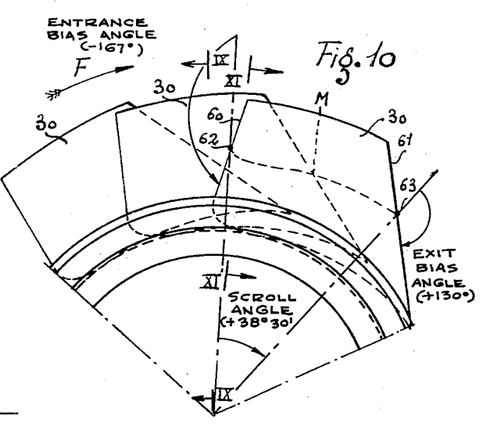
Fig. 10 is a partial view of this reaction member in the direction of the arrows X—X of Fig. 9.
Figure 11:
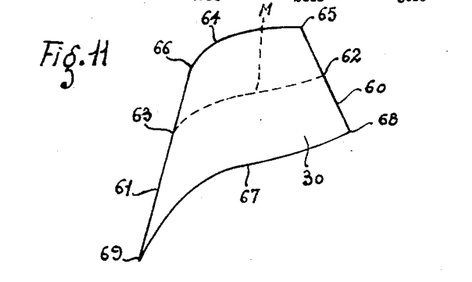
Fig. 11 is a view of a blade of the reaction member in the direction of the arrows XI—XI of Fig. 10.

The entrance edges 60 and exit edges 61 of each blade 30 are all straight and make angles with planes which are starting from the axis X and which would pass respectively through their points 62 and 63 located on the surface M. The edge 60 is made such that with the plane which corresponds to it, its projection on to a plane perpendicular to the axis makes an entrance bias angle of —167°. The edge 61 makes an exit bias angle of +130°. The scroll angle, that is to say the dihedral formed by the planes starting from the axis and passing respectively through the points 62 and 63 is +38°30′. Along the design path surface M, the blade angle of each blade 30 increases from the point 62 up to the point 63. This angle has a value of 0° at the point 62 and +68° at the point 63.

Following the line 64 of each blade 30 which forms a free edge close to the shell I, the blade angle (see Fig. 2a) increases from the entrance point 65 up to the exit point 66. The angle has a value of 0° at the point 65 and +74°30′ at the point 69.

Along the line 67 of each blade 30 at the contact of the shell E, the blade angle increases from the entrance point 68 up to the exit point 69. This angle has a value of 0° at the point 68 and a value of +66°30′ at the point 69.

The pressure face of each blade 30 (which can be seen in Fig. 10 but is hidden in Fig. 11) makes an angle with the wall 31 which increases from 75° at point 68 to 135° at point 69.

The part of this pressure face which is adjacent the entrance edge 60 fits over a portion of a conical surface, the apex of which is at a distance from the axis amounting preferably to between 30% and 50% of the diameter D (see Fig. 2). This arrangement has an additional advantage in construction when the blades 30 are made of sheet steel.

Figure 2B:
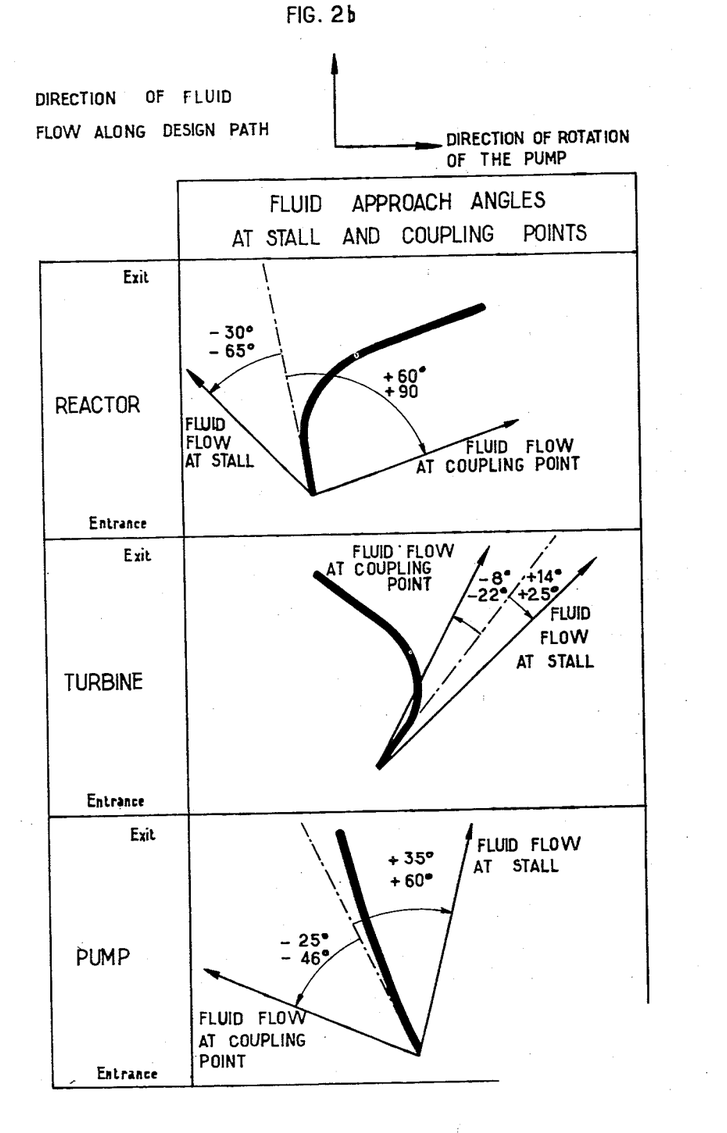
Fig. 2b illustrates the fluid approach angles at stall and coupling points.

The entrance and exit of the blades of the converter are such that on the design path surface, the direction of the fluid passing into each member makes, with the mean camber surface of the blades of this member with the turbine stalled, an angle of +48° at the entrance of the pump, an angle of +20° at the entrance of the turbine and an angle of —56° at the entrance of the reactor and, at the coupling point, an angle of —35° at the entrance of the pump, an angle of —14° at the entrance of the turbine, and an angle of +67° at the entrance of the reactor (see Fig. 2b).

Figure 12:
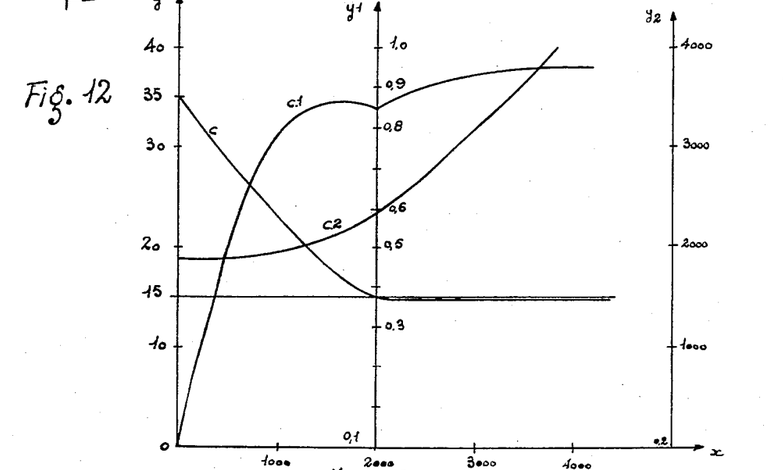
Fig. 12 is a diagram which illustrates the performance of the converter.

Reference will now be made to the diagram of Fig 12, which illustrates the performance of the torque converter which has just been described with reference to Figs. 1 to 11, and the diameter D of which (see Fig. 2) is 265 mm. The diagram of Fig. 12 relates by way of example to such a converter which has effectively been built of sheet steel and tested on an automobile touring vehicle having a power of 50 to 70 H.P. and a weight when empty of 1,000 kgs. to 1,500 kgs.

As the abscissae Ox is plotted the angular speed in revolutions per minute of the turbine T recorded for a constant driving torque of 15 meter-kilograms. As the ordinates Oy are plotted the values of torque at the turbine in meter-kilograms. As ordinates $O_1y_1$ is plotted the efficiency. As ordinates $O_2y_2$ is plotted the angular speed of the pump P in revolutions per minute. The variations in the torque at the turbine are illustrated by the curve C, those of the efficiency by the curve $C_1$ and those of the angular speed of the pump P by the curve $C_2$.

With a stalled turbine, this diagram shows that there is obtained a torque ratio of about 2.30 for a motor speed of 1900 r.p.m. In the torque conversion range, the efficiency increases rapidly. For a turbine speed of 1,000 r.p.m. and the same input torque of 15 meter-kilograms, an input speed of 1960 r.p.m. and an output torque of 23.4 meter-kilograms are obtained, corresponding to a torque ratio of 1.56 and an efficiency of 0.79. At a turbine speed of 1200 r.p.m., and the same input torque of 15 meter-kilograms, an input speed of 2,000 r.p.m. and an output torque of 21 meter-kilograms are obtained, corresponding to a torque ratio of 1.40 and an efficiency of 0.84. The maximum efficiency is obtained for the same input torque of 15 meter-kilograms at a turbine speed of 1590 r.p.m., the input speed being 2140 r.p.m. and the torque ratio amounting to 1.17; the value of the maximum efficiency is 0.87. The torque ratio decreases down to unity, whilst the turbine continues to increase in speed. The coupling point corresponds to an efficiency of 0.85 for a turbine speed of 2020 r.p.m. and a pump speed of 2370 r.p.m. It is seen that during the torque conversion range, the input speed is slightly increasing and passes from 1900 r.p.m. at stall to 2370 r.p.m. at the coupling point, and the variation of the input speed is about 25%, which value permits of a motor speed favourable to acceleration at low speeds. After the coupling point, the efficiency attains 0.90 and 0.95 for turbine speeds of 2380 r.p.m. and 3400 r.p.m. respectively.

In an alternative form, the arrangement is substantially similar to that which has just been described and relates more especially, but not exclusively, to a converter which in this case is made by casting. The features of this alternative form are as follows:

The pump is provided with twenty-six blades, the turbine has nineteen and the reactor fifteen.

Along the design path surface, the blade angles (see Fig. 2a) are: for the pump, −32° at the entrance and −22°30′ at the exit, for the turbine, +55° at the inlet and −59° at the exit, for the reactor +2° at the inlet and +69° at the exit.

Along the inner shell the blade angles are: for the pump −35° at the entrance and −23° at the exit, for the turbine +57° at the entrance and −60° at the exit, for the reactor +5°40′ at the entrance and +71° at the exit.

Along the outer shell, the blade angles are: for the pump −30° at the entrance and −22° at the exit, for the turbine +54°30′ at the entrance and −58° at the exit, for the reactor 0° at the entrance and +67° at the exit.

The entrance bias angle is +151° for the pump, −40° for the turbine and −161° for the reactor.

The scroll angle is −20° for the pump, −3°30′ for the turbine and +40° for the reactor.

The entrance and the exit of the blades of the converter are such that on the design path surface, the direction of the fluid passing into each member makes with the mean camber surface of the blades of that wheel with the turbine stalled, an angle of +47° at the entrance of the pump, an angle of +18° at the entrance of the turbine, and an angle of −61° at the entrance of the reactor, and, at the coupling point, an angle of −36° at the entrance of the pump, an angle of −15° at the entrance of the turbine, and an angle of +65° at the entrance of the reactor (see Fig. 2b).

In a further alternative form which relates to an application of the invention, without implied limitation, to a vehicle of the lifting trolley type, the features are as follows:

The pump comprises twenty-eight blades, the turbine twenty-three and the reactor fifteen.

Along the design path surface, the blade angles (see Fig. 2a) are: for the pump −38°40′ at the entrance and −30° at the exit, for the turbine +56° at the entrance and −58° at the exit, for the reactor −22°30′ at the entrance and +69° at the exit.

Along the inner shell, the blade angles are: for the pump −40° at the entrance and −30° at the exit, for the turbine +57° at the entrance and −59° at the exit, for the reactor −23° at the entrance and +72° at the exit.

Along the outer shell, the blade angles are: for the pump −38° at the entrance and −30° at the exit, for the turbine +55° at the entrance and −57° at the exit, for the reactor −22° at the entrance and +66°30′ at the exit.

The entrance bias angle is +173° for the pump, −29° for the turbine and −156° for the reactor.

The scroll angle is −27°30′ for the pump, −8°30′ for the turbine and +30° for the reactor.

The entrance and the exit of the blades of the converter are such that on the design path surface, the direction of the fluid passing into each member makes with the mean camber surface of the blades of that member, with the turbine stalled, an angle of +59° at the entrance of the pump, an angle of +14° at the entrance of the turbine, an angle of −35° at the entrance of the reactor and, at the coupling point, an angle of −28° at the entrance of the pump, an angle of −22° at the entrance of the turbine and an angle of +89° at the entrance of the reactor (see Fig. 2b).

For a clearer understanding of the two latter alternative forms which have just been described, reference can be made to Figs. 1 to 11, taking account of the necessary adaptation to the numerical figures indicated.

Figure 2C:
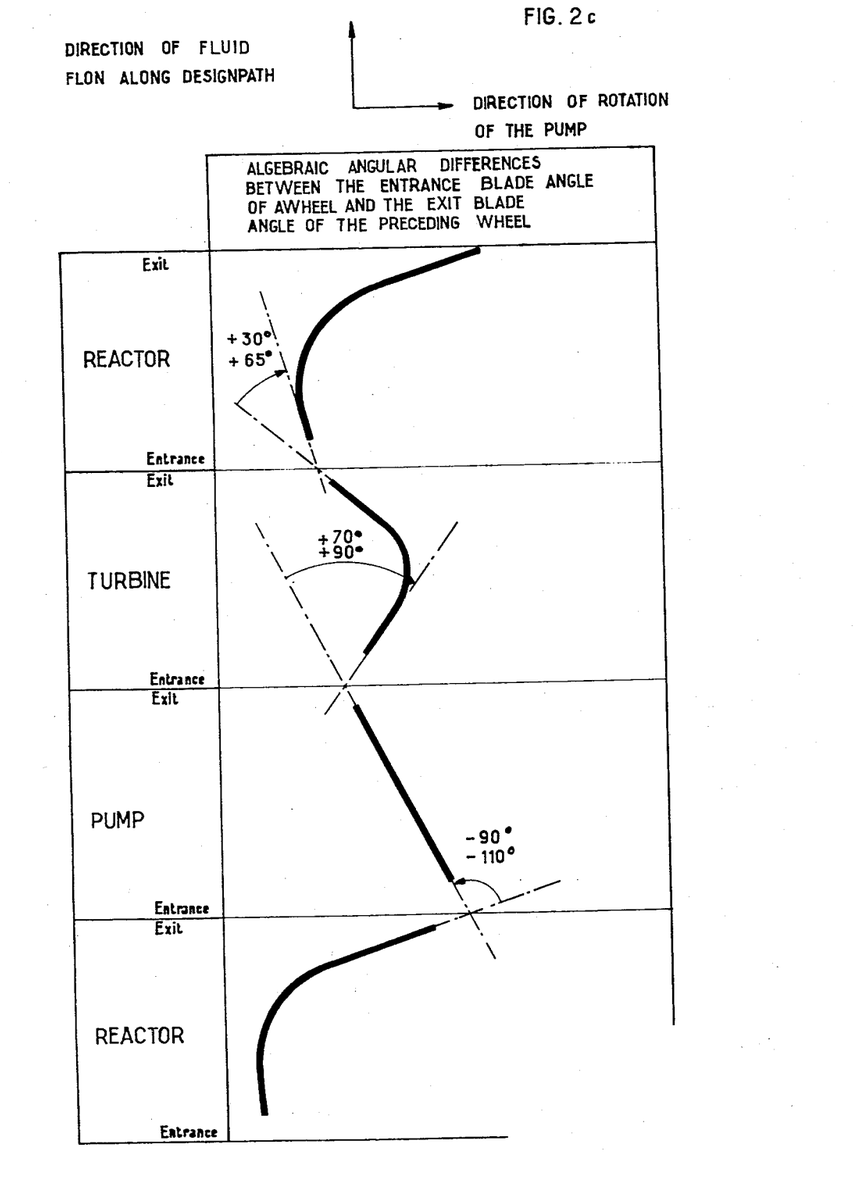
Fig. 2c illustrates the algebraic differences between the entrance blade angle of each wheel and the exit blade angle of the preceding wheel.

In all the embodiments which are above described it will be noted that the algebraic differences between the entrance blade angle of any one of the three members, pump, turbine, reactor, and the exit blade angle of the preceding member are preferably comprised (see Fig. 2c): for the turbine and the pump, between +70° and +90°; for the reactor and the turbine, between +30° and +65°; and for the pump and the reactor, between −90° and −110°.

What I claim is:

1. A two-phase hydraulic torque converter of the kind comprising: a bladed pump, a bladed turbine and a bladed reactor; a fluid for filling said converter; passages formed between said pump, turbine and reactor, the passage between the pump and turbine being located in the zone of the toroidal fluid circuit which is farthest away from the axis of said converter, while the said reactor extends into the zone of said fluid circuit nearest to the said axis; entrance and exit orifices for said pump, turbine and reactor, the entrance and exit orifices of said reactor being located at substantially the same distance from the said axis; wherein along the design path surface of said fluid, the exit blade angle of said pump is chosen between −20° and −30°; and along the inner shell of said converter the blade angles are chosen: at the pump entrance between −16° and −42°, at the pump exit between −21° and −32°; at the turbine entrance between +45° and +60°, at the turbine exit between −53° and −63°; at the reactor entrance between −35° and +15°, and at the reactor exit between +68° and +76°, the blade angles at the entrance and at the exit of each member, pump, turbine, reactor, on the inner shell being greater in absolute value by an amount between 0° and 10° than their corresponding values on the outer shell.

2. A two-phase hydraulic torque converter of the kind comprising: a bladed pump, a bladed turbine and a bladed reactor; a fluid for filling said converter; passages formed between said pump, turbine and reactor, the passage between the pump and turbine being located in the zone of the toroidal fluid circuit which is farthest away from the axis of said converter, while the said reactor extends into the zone of said fluid circuit nearest to the said axis; entrance and exit orifices for said pump, turbine and reactor, the entrance and exit orifices of said reactor being located at substantially the same distance from the said axis; wherein along the design path surface of said fluid, the exit blade angle of said pump is chosen between −20° and −30°; and along the outer shell of said converter the blade angles are chosen: at the pump entrance between −8° and −40°, at the pump exit between −20° and −30°; at the turbine entrance between +35° and +57°, at the turbine exit between −50° and −60°; at the reactor entrance between −32° and +10°, and at the reactor exit between +58° and +70°, the blade angles at the entrance and at the exit of each member, pump, turbine, reactor on the inner shell being greater in absolute value by an amount between 0° and 10° than their corresponding values on the outer shell.

3. A two-phase hydraulic torque converter of the kind comprising: a bladed pump, a bladed turbine and a bladed reactor; a fluid for filling said converter; passages formed between said pump, turbine and reactor, the passage between the pump and turbine being located in the zone of the toroidal fluid circuit which is farthest away from the axis of said converter while the said reactor extends into the zone of said fluid circuit nearest to the said axis; entrance and exit orifices for said pump, turbine and reactor, the entrance and exit orifices of said reactor being located at substantially the same distance from said axis; wherein the entrance blade angles along the design path surface are chosen between —10° and —40° for the pump, between +40° and +60° for the turbine, and between —35° and +10° for the reactor, the corresponding exit blade angles being chosen between —20° and —30° for the pump, between —45° and —65° for the turbine, and between +60° and +75° for the reactor, the blade angles at the exit of each member, pump, turbine and reactor on the inner shell being greater in absolute value by an amount between 0° and 10° than their corresponding values on the outer shell.

4. A torque converter as claimed in claim 3, in which the pump is provided with a number of blades between 22 and 30, the turbine from 18 to 25 blades, and the reactor from 11 to 19 blades.

5. A torque converter as claimed in claim 3, in which the entrance bias angle are comprised between +135° and +155° for the pump, between —23° and —40° for the turbine, —155° and —171° for the reactor; the exit bias angles are comprised between —50° and +5° for the pump, —140° and —153° for the turbine, +125° and +133° for the reactor; and the scroll angles are comprised between —15° and —30° for the pump, —3° and —10° for the turbine, +37° and +42° for the reactor.

6. A two-phase hydraulic torque converter of the kind comprising: a bladed pump, a bladed turbine and a bladed reactor; a fluid for filling said converter; passages formed between said pump, turbine and reactor, the passage between the pump and turbine being located in the zone of the toroidal fluid circuit which is farthest away from the axis of said converter, while the said reactor extends into the zone of said fluid circuit nearest to the said axis; entrance and exit orifices for said pump, turbine and reactor, the entrance and exit orifices of said reactor being located at substantially the same distance from said axis; wherein the entrance blade angles along the design path surface are chosen between —25° and —35° for the pump, between +50° and +60° for the turbine, and between —20° and +10° for the reactor, the corresponding exit blade angles being chosen between —20° and —25° for the pump, between —50° and —60° for the turbine, and between +65° and +70° for the reactor.

7. A two-phase hydraulic torque converter of the kind comprising: a bladed pump, a bladed turbine and a bladed reactor; a fluid for filling said converter; passages formed between said pump, turbine and reactor, the passage between the pump and turbine being located in the zone of the toroidal fluid circuit which is farthest away from the axis of said converter, while the said reactor extends into the zone of said fluid circuit nearest to the said axis; entrance and exit orifices for said pump, turbine and reactor, the entrance and exit orifices of said reactor being located at substantially the same distance from said axis; wherein the entrance blade angles along the design path surface are chosen between —35° and —40° for the pump, between +51° and +57° for the turbine, and between —26° and —20° for the reactor, the corresponding exit blade angles being chosen between —25° and —30° for the pump, between —53° and —59° for the turbine, and between +65° and +71° for the reactor.

References Cited in the file of this patent

UNITED STATES PATENTS

| | | |
|---|---|---|
| 2,306,758 | Schneider et al. | Dec. 29, 1942 |
| 2,410,185 | Schneider et al. | Oct. 29, 1946 |
| 2,663,148 | Jandasek | Dec. 22, 1953 |
| 2,663,149 | Zeidler et al. | Dec. 22, 1953 |

FOREIGN PATENTS

| | | |
|---|---|---|
| 414,500 | Great Britain | Aug. 9, 1934 |

OTHER REFERENCES

"Hydraulic Drive Terminology," pages 792–794 of 1952 SAE Handbook.